(12) United States Patent
Tao et al.

(10) Patent No.: US 7,545,827 B2
(45) Date of Patent: Jun. 9, 2009

(54) BUSY TONE FOR WIRELESS NETWORKS

(75) Inventors: Meixia Tao, Hong Kong (CN); Yan Wang, Hong Kong (CN); Soung C. Liew, Hong Kong (CN); Kent Chen, Hong Kong (CN); Vincent Lau, Hong Kong (CN)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 817 days.

(21) Appl. No.: 10/778,923

(22) Filed: Feb. 13, 2004

(65) Prior Publication Data

US 2005/0180357 A1 Aug. 18, 2005

(51) Int. Cl.
*H04L 12/413* (2006.01)
(52) U.S. Cl. .................... 370/447; 370/328; 455/296
(58) Field of Classification Search ............. 370/328, 370/447; 455/296
See application file for complete search history.

(56) References Cited

U.S. PATENT DOCUMENTS

| | | | | |
|---|---|---|---|---|
| 5,303,263 | A | * | 4/1994 | Shoji et al. .............. 375/229 |
| 5,757,790 | A | * | 5/1998 | Taketsugu ............... 370/342 |
| 6,134,231 | A |   | 10/2000 | Wright |
| 6,539,028 | B1 |  | 3/2003 | Soh et al. |
| 6,889,154 | B2 | * | 5/2005 | Ashley et al. ............ 702/107 |
| 7,061,877 | B1 | * | 6/2006 | Gummalla et al. ....... 370/278 |
| 7,373,129 | B2 | * | 5/2008 | Fukuda et al. ............ 455/296 |
| 2002/0172186 | A1 | * | 11/2002 | Larsson ................... 370/349 |
| 2003/0026198 | A1 | * | 2/2003 | Diepstraten et al. ...... 370/208 |

FOREIGN PATENT DOCUMENTS

CN 1 462 524 12/2003

OTHER PUBLICATIONS

International Search Report issued for PCT/CN2005/000186, dated May 26, 2005.

* cited by examiner

*Primary Examiner*—Jason E Mattis
(74) *Attorney, Agent, or Firm*—Fulbright & Jaworski L.L.P.

(57) ABSTRACT

Disclosed are systems and methods which provide a busy tone or signal for use in communication collision avoidance in a wireless network, such as a WLAN, a cellular network, or other point-to-multipoint wireless network. An intelligent busy tone generator, upon the proper conditions, transmits a busy tone or signal to one or more wireless device which may otherwise be hidden from particular communications. According to embodiments the busy tone mimics a carrier sequence of an actual transmission to facilitate the wireless devices recognizing the channel as busy. Because the original uplink packet may be interfered by transmission of a busy tone carrier-sense sequence, embodiments are provided with interference cancellation capability. Interference cancellation circuitry of embodiments may operate in a plurality of modes, including a training mode (including an online training mode, an offline training mode, and a hybrid or combined mode) and an operating mode.

35 Claims, 6 Drawing Sheets

BUSY TONE FOR WIRELESS NETWORKS

TECHNICAL FIELD

The present invention relates generally to wireless communications and, more particularly, to provision of a busy tone or signal for use in communication collision avoidance.

BACKGROUND OF THE INVENTION

Wireless links, such as radio frequency (RF) links, are becoming widely used in providing communication of information, including images, audio, and/or data. For example, wireless local area networks (WLANs) have recently become available as an alternative to wired local area networks. With a WLAN, wires are replaced with wireless links between an access point (AP) and wireless devices. Wireless devices may include desktop computers, portable computers, personal digital assistants (PDAs), printers, servers, and/or other devices that exchange information via wireless links.

An access point typically transmits and receives data to and from a wireless device within a coverage area. The coverage area may correspond to an office, house, building or other area of operation. Each wireless device may exchange information with the access point while in the coverage area and contends for the bandwidth provided by the access point with other wireless nodes (e.g., wireless devices and/or access points) in the coverage area. Accordingly, protocols are typically implemented, such as at the media access control (MAC) layer to resolve communication link contention.

For example, the IEEE 802.11 media access control standard proposes a random access technique, also widely implemented in wired networks, which uses a carrier sense with collision avoidance (CSMA/CA) scheme. Pursuant to CSMA/CA, a wireless device waits until no other wireless device is transmitting on a chosen channel and then transmits data. If a collision occurs, the transmitting device backs off a random interval of time and begins again if the channel is clear. Pursuant to this technique, individual wireless devices eventually get access to the channel that the device is trying to access.

However, a carrier sense with collision avoidance technique alone is not well suited for dealing with the problem of hidden-nodes, e.g., wireless devices which have a sufficiently clear communication path with a common access point but which are positioned so as to have communications between the wireless devices themselves blocked or outside of the other wireless device's radiation pattern (antenna beam). In the hidden-node situation, a first and second node may each perceive the communication channel to an access point as clear, although the other node is transmitting. Simultaneous transmission by both such nodes can result in interference blocking both node's communications, with even the above mentioned waiting a random interval of time and retransmitting the message resulting in repeated overlapping communications and further blockage.

Request-to-send/clear-to-send (RTS/CTS) exchange protocols have been developed for use in addressing the hidden-node problem of the CSMA/CA protocol in the IEEE 802.11 MAC specifications. The use of RTS/CTS protocols, however, does not address the instances in which RTS or CTS packets themselves collide. For example, a collision window remains with respect to uplink transmission of the RTS packet, wherein this collision window is of a time corresponding to the RTS packet length. Moreover, transmission of RTS and CTS packets consumes bandwidth which might otherwise be available for transmission of payload using the wireless communication links. Additionally, the use of RTS/CTS requires adaptation of all the nodes to accommodate the RTS/CTS transmissions and to invoke the protocol.

Another prior attempt to address the hidden-node problem has included the use of a repeater station, as shown in U.S. Pat. No. 6,539,028 to Soh et al., the disclosure of which is incorporated herein by reference. The repeater comprises a demodulator, a modulator and a power level monitor. When the repeater receives wireless communications on an uplink channel, the repeater retransmits the wireless communication on a downlink channel, wherein the downlink channel has a different transmission wavelength than the uplink channel. The wireless nodes perform collision detection by comparing a delayed form of their transmitted bit pattern with the bit pattern received from the repeater. Accordingly, the use of the foregoing repeater requires added hardware in the form of the repeater itself. In addition, the repeater may be utilized only with respect to frequency division duplex communication systems, as separate uplink and downlink wavelengths are required.

There is a need in the art for an efficient technique for avoiding communication transmission collisions in a wireless network, such as a WLAN, that does not require adaptation or alteration of each wireless node thereof. There is a further need in the art for a technique for avoiding communication transmission collisions which does not consume otherwise available bandwidth.

BRIEF SUMMARY OF THE INVENTION

The present invention is directed to systems and methods which provide a busy tone or signal for use in communication collision avoidance in a wireless network, such as a WLAN, a cellular network, or other point-to-multipoint wireless network. According to a preferred embodiment, an intelligent busy tone generator (IBTG) is provided in an access point based wireless network to overcome the hidden-node problem. The IBTG of one embodiment comprises "front-end" circuitry which may be disposed in the receive path of the AP to pass received signals to the AP for processing and which, upon the proper conditions, transmits a busy tone or signal to one or more wireless device which may otherwise be hidden from particular communications. For example, upon uplink preamble acquisition by the IBTG, a sequence, e.g. preamble pattern or carrier sequence, may be transmitted in the downlink for carrier sensing by the wireless devices.

According to a preferred embodiment, transmission of the busy tone by a IBTG of the present invention is accomplished substantially immediately upon acquisition of an uplink preamble. For example, a very brief processing delay period "D" may transpire between the first bit of an uplink preamble and the transmission of a busy tone to accommodate the IBTG receiving sufficient preamble bits to identify the transmission as a valid uplink preamble and/or to accommodate any propagation delay associated with the feedback path of the IBTG. Accordingly, a collision window is significantly shortened from a time "T" associated with the uplink received packet length, to D, the acquisition delay, because the wireless devices will be able to detect the downlink busy tone carrier sequence and recognize that the medium is busy.

It should be appreciated that embodiments of an IBTG according to the present invention does not require alteration of client wireless devices because the busy tone sufficiently mimics a carrier sequence of an actual transmission to facilitate the wireless devices recognizing the channel as busy. Accordingly, embodiments of the IBTG can be implemented as software and/or hardware coupled to an AP, without altering any existing baseband processor and MAC controller and without altering corresponding wireless devices.

Due to insufficient transmit-receive antenna isolation at the AP side with IBTG embedded, the original uplink packet may be interfered by transmission of the busy tone carrier-sense sequence leaking through the feedback path. Therefore, an IBTG of a preferred embodiment is provided with interference cancellation capability. Interference cancellation circuitry of embodiments of the present invention is adapted to operate in a plurality of modes, including a training mode (e.g., training sequence transmission and interference estimation) and an operating mode (e.g., carrier transmission and interference cancellation). Embodiments of the present invention provide for offline training, online training, and combinations thereof.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
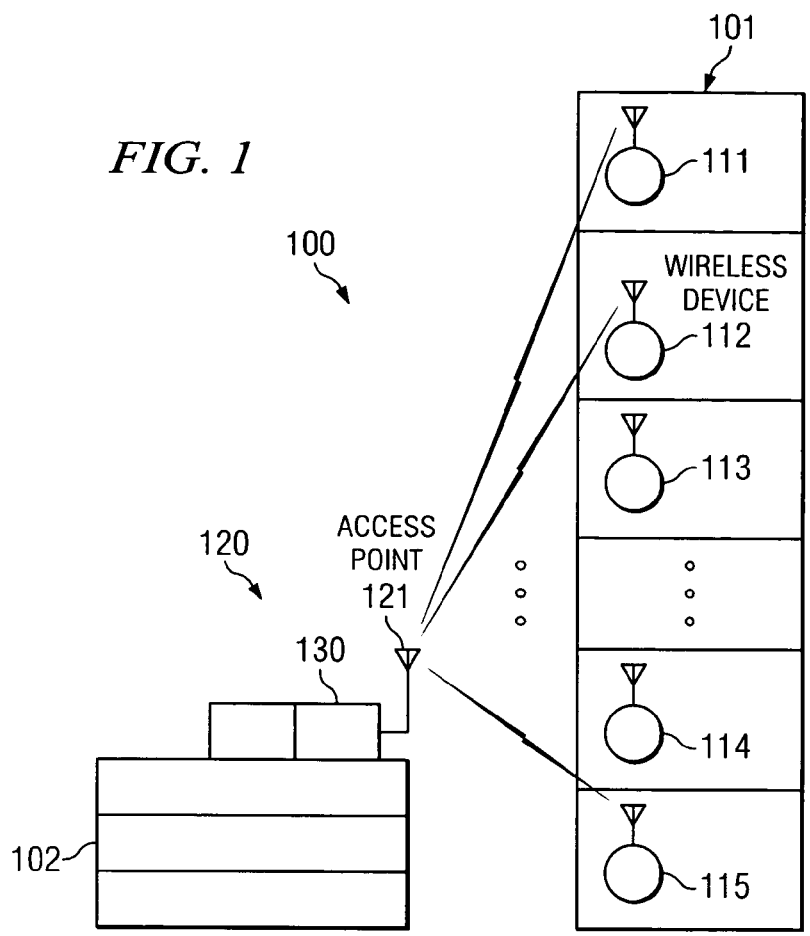
FIG. 1 shows an exemplary wireless network situation in which a hidden-node problem may exist.

Directing attention to FIG. 1, an exemplary situation in which a hidden-node problem may exist is shown. To aid the reader in understanding the concepts of the present invention, wireless network 100 of FIG. 1 will be discussed herein with respect to a wireless local area network (WLAN) embodiment, such as may employ IEEE 802.11 communications protocols. However, it should be appreciated that the concepts of the present invention are applicable to any number of wireless communication networks, such as may comprise local area networks (LANs), metropolitan area networks (MANs), wide area networks (WANs), cellular communication networks, intranets, extranets, the Internet, etcetera, and as may utilize any number of communications protocols in which hidden-nodes are an issue.

Wireless network 1000 of FIG. 1 includes various wireless devices 111-115, such as may comprise desktop computers, portable computers, personal digital assistants (PDAs), printers, servers, cellular telephones, pagers, appliances, cameras, local area networks (LAN), and/or other devices that exchange information via wireless links, disposed throughout building 101. Access point (AP) 120 of wireless network 100, having antenna 121 coupled thereto, is disposed external to building 101, such as on or in building 102, to provide a clear or substantially clear radiation path between each of wireless devices 111-115 and AP 120 and thereby facilitate communication between the wireless devices and the AP.

Although not shown in FIG. 1 for simplification of the figure, AP 120 may be coupled, whether by wireless or wireline links, to any number of other devices. For example, AP 120 may present an Internet service provider (ISP) point-of-presence (POP), and therefore be coupled to a high-speed Internet backbone (not shown). Similarly, AP 120 may be part of a larger network system (not shown) and/or may provide a gateway to networks implementing different protocols.

Although each of wireless devices 111-115 may be provided a substantially clear "view" of AP 120, one or more of the wireless devices may be prevented from receiving wireless signals of the other wireless devices. For example, the walls, ceilings, and/or floors of building 101, which may comprise relatively dense materials such as concrete and metals, may not allow radio signals of the different wireless devices to penetrate portions of the building. As such, some or all of wireless devices 111-115 may not be directly "visible," e.g., no direct radio frequency (RF) link may be established, to other ones of wireless devices 111-115, thus presenting hidden-nodes with respect to each other.

Hidden-nodes may additionally be presented in situations where various wireless devices are disposed outside of other wireless device's radiation patterns (antenna beams). For example, to increase the effective coverage area, wireless devices may utilize high gain directional antennas which point to a common access point, which may use an omni directional antenna, one or more directional antennas, or combinations thereof. In this situation, the access point can communicate with all the wireless devices, although one or more wireless device may not be "visible" to other wireless devices due to their use of a directional antenna.

In the hidden-node situation, a first node (e.g., wireless device 111) and a second node (e.g., wireless device 112) may each perceive the communication channel to AP 120 as clear, although the other node is transmitting. Simultaneous transmission by both such nodes can result in interference blocking both node's communications.

Request-to-send/clear-to-send (RTS/CTS) exchange protocols have been developed for use in addressing the hidden-node problem of the carrier sense, multiple access, with collision avoidance (CSMA/CA) protocol in the IEEE 802.11 media access control (MAC) specifications. The use of RTS/CTS protocols, however, does not address the instances in which RTS or CTS packets themselves collide. For example, a collision window remains with respect to uplink transmission of the RTS packet by the mutually hidden-nodes wireless device 111 and wireless device 112. Additionally, the transmission of these RTS and CTS packets consumes bandwidth.

Figure 2:
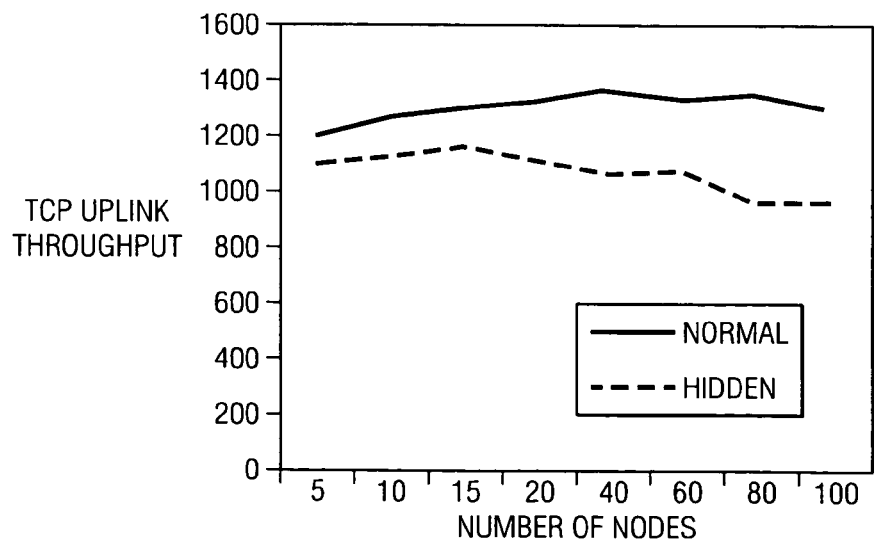
FIG. 2 shows a graph of simulation results showing a performance comparison in terms of the TCP uplink throughput with RTS/CTS implemented.
Figure 3:
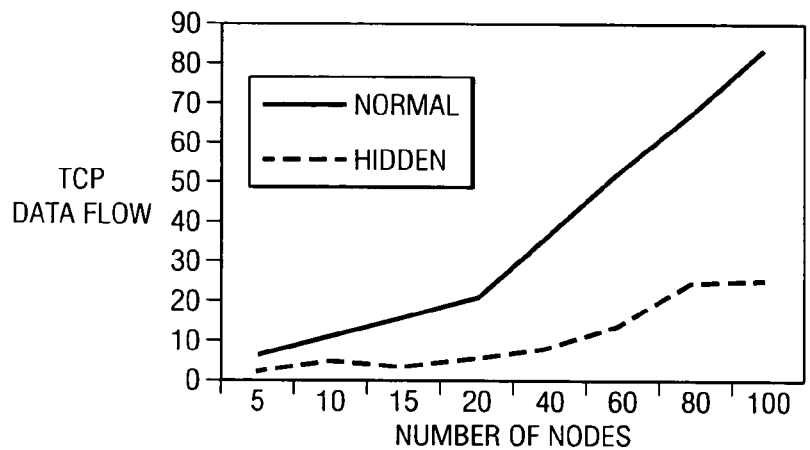
FIG. 3 shows a graph of simulation results showing a performance comparison in terms of the number of data flows alive with RTS/CTS implemented.

Directing attention to FIGS. 2 and 3, graphs of simulation results show the performance comparison in terms of the TCP uplink throughput (FIG. 2) and the number of data flows alive (FIG. 3) with RTS/CTS implemented. FIGS. 2 and 3 each provide the results of simulation of a no hidden-node scenario (e.g., all wireless devices are within "view" of all other wireless devices) and a hidden-node scenario (e.g., all wireless devices "view" only the common AP). It can be seen that when the number of hidden nodes increases both the network throughput and fairness degrade significantly. Accordingly, it can be seen that the use of RTS/CTS is not completely effective in addressing hidden-node problems in a wireless network.

Embodiments of the present invention provide a busy tone or signal for use in communication collision avoidance in a wireless network, such as network 100 of FIG. 1. According to one embodiment, intelligent busy tone generator (IBTG) 130 is provided in association with AP 120 for use in addressing hidden-node problems. According to embodiments of the present invention, IBTG 130 may be embedded within AP 120 as a part of the front-end circuitry thereof. According to alternative embodiments IBTG 130 may comprise an applique configuration, such as may be coupled between an antenna and an otherwise substantially unaltered commercially available AP (e.g., a commercially available AP operable according to the IEEE 802.11 protocol).

According to embodiments of the present invention, IBTG 130, whether in an embedded or applique configuration, is disposed in the receive path of AP 120 and passes received signals for processing in accordance with the typical communication operations of an AP in wireless network 100 (e.g., processing according to IEEE 802.11 protocols). Preferred embodiments do not implement changes which alter existing baseband processors or MAC controllers of the wireless network. However, IBTG 130 of preferred embodiments does provide processing of receive signals for intelligent generation of a busy tone. For example, upon the proper conditions (e.g., upon sensing an appropriate carrier), IBTG 130 transmits a busy tone or signal to one or more wireless device which may otherwise be hidden from particular communications. According to one embodiment, upon uplink preamble acquisition by IBTG 130, a sequence, e.g. preamble pattern or carrier sequence, may be transmitted in the downlink for carrier sensing by wireless devices 111-115. In operation according to a preferred embodiment, IBTG 130 transmits a carrier-sensing sequence (busy tone) until the reception of the uplink packet is finished, as may be detected using the same circuitry used in preamble acquisition.

Figure 4:
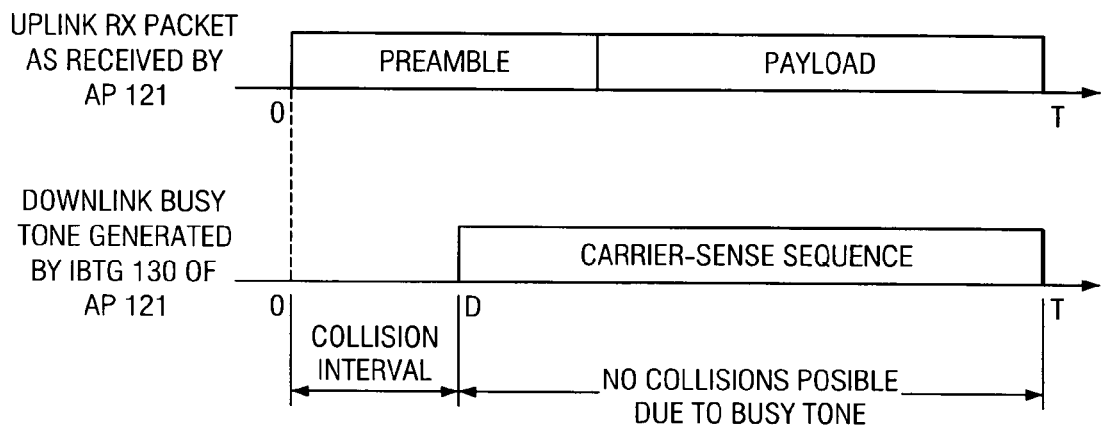
FIG. 4 shows a collision window of length D associated with the acquisition delay of embodiments of the present invention.

Transmission of a busy tone by IBTG 130 is preferably accomplished substantially immediately upon acquisition of an uplink preamble. For example, a very brief processing delay period "D" may transpire between reception of the first bit of an uplink preamble and the transmission of a busy tone to accommodate the IBTG receiving sufficient preamble bits to identify the transmission as a valid uplink preamble and/or to accommodate any propagation delay associated with the feedback path of the IBTG. Accordingly, a very short collision window of length D, the acquisition delay, is presented by embodiments of the present invention as shown in FIG. 4 because wireless devices 111-115 will be able to detect the downlink busy tone carrier sequence and recognize that the medium is busy. It is expected that the processing delay period D will be on the order of 20 to 40 micro seconds in a typical implementation, such as in an IEEE 802.11 WLAN implementation.

It should be appreciated that the foregoing embodiment of the present invention does not involve alteration of wireless devices 111-115 in implementing collision avoidance because the busy tone sufficiently mimics a carrier sequence of an actual transmission to facilitate the wireless devices recognizing the channel as busy. Accordingly, embodiments of the IBTG can be implemented as an AP adapted according to the present invention, without modification to corresponding wireless devices.

Although it may be possible to provide an embodiment of an IBTG of the present invention which is separate and discrete from a corresponding AP or other network node in communication with a plurality of wireless devices disposed in a hidden-node configuration, preferred embodiments of an IBTG according to the present invention are in communication with a corresponding AP in order to provide mitigation of interference associated with the generated busy tone. Specifically, a busy tone generated according to preferred embodiments of the present invention is transmitted on a same channel (e.g., frequency channel, time division channel, and/or code division channel) as a received uplink communication in order to mimic an uplink transmission by a wireless device, and thereby be readily detected by hidden-nodes as a communication channel in use by another wireless device. However, due to insufficient transmit-receive antenna isolation between the receive path (e.g., receive antenna) of the AP and the transmit path (e.g., transmit antenna) of the IBTG, the original uplink packet may be interfered by transmission of the busy tone carrier-sense sequence.

Therefore, IBTG 130 of a preferred embodiment provides interference cancellation with respect to signals passed for communication processing to baseband circuitry of AP 120. Interference cancellation circuitry of embodiments of the present invention operates in a plurality of modes, including a training mode (e.g., training sequence transmission and interference estimation) and an operating mode (e.g., carrier transmission and interference cancellation). Embodiments of the present invention provide for offline training, online training, and combinations thereof. According to embodiments of the invention, it is assumed that the channel between a transmitter and a receiver is substantially constant, at least for some period of time, thereby facilitating the use of a training mode implemented at a different time than an operating mode.

Figure 5A:
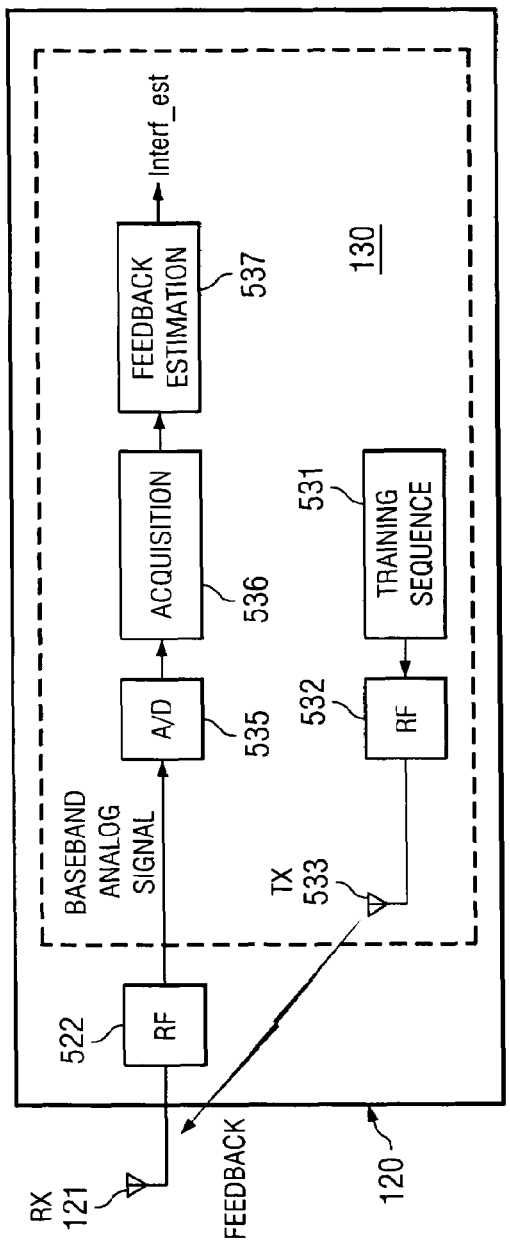
FIGS. 5A and 5B show a functional block diagram of an intelligent busy tone generator adapted to provide offline training according to an embodiment of the present invention.
Figure 5B:
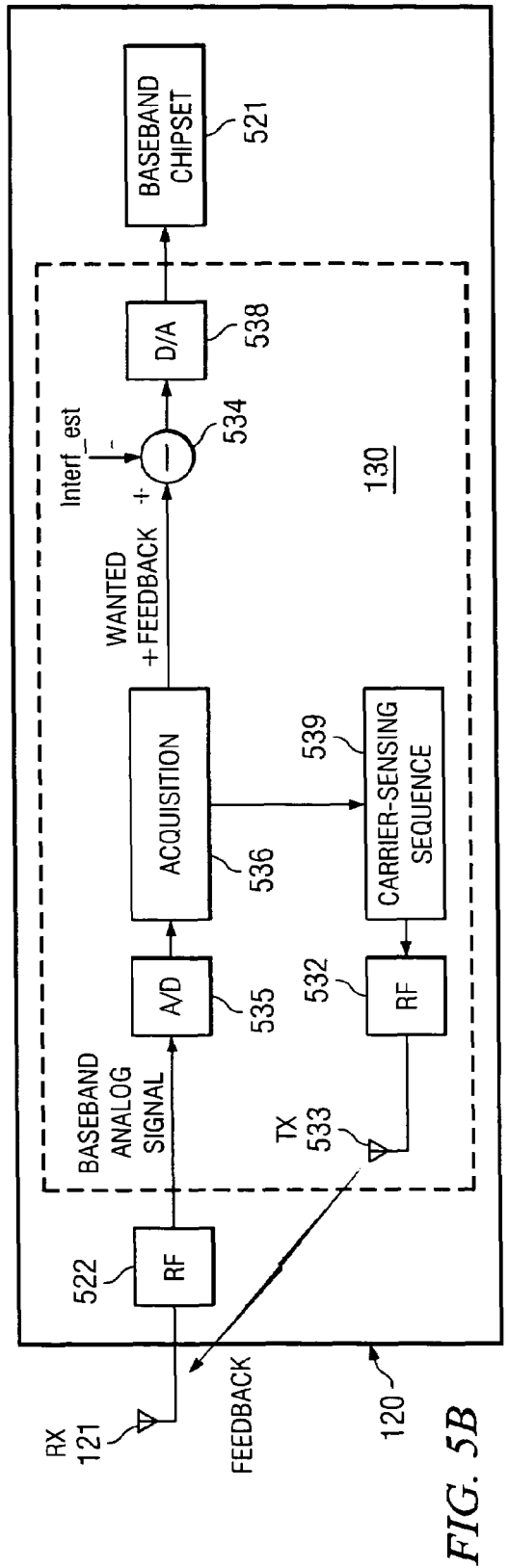

FIGS. 5A and 5B show a functional block diagram of IBTG 130 adapted to provide offline training according to an embodiment of the present invention. In offline training, the training is done when the channel is free (e.g., not otherwise being utilized in providing wireless communications). Accordingly, FIG. 5A shows a functional block diagram of IBTG 130 operating in a training mode during a time in which the communication channel is otherwise unused, such as at power-up, between communication bursts, when a predetermined period of link idle time has been detected, etcetera. Correspondingly, FIG. 5B shows a functional block diagram of IBTG 130 operating in an operating mode during a time in which the communication channel is being used for uplink communication by one of wireless devices 111-115.

RF circuitry 522 of the embodiments illustrated in FIGS. 5A and 5B operates in reception mode, providing gain steps and down conversion from RF frequency to baseband signal. Analog to digital (A/D) converter 535 (preferably including A/D conversion for an in-phase (I) component of the received signal and a quadrature (Q) component of the received signal) takes the baseband analog signal, oversamples it, and digitizes it. Acquisition circuitry 536 of a preferred embodiment comprises a combination of carrier detector, e.g., based on the detection of Barker code modulated symbols, and a bit pattern detector, e.g., based on the given scrambled and differentially encoded preamble bits specified in the communication standards used by wireless network 100, such as IEEE 802.11b protocols. In operation, during a time of channel communication inactivity, an offline training sequence is sent out through RF circuitry 532 and transmit antenna 533. RF circuitry 532 of the illustrated embodiment handles filtering, up-conversion, and amplification of signals.

The circuitry of AP 120 is shown only with respect to an uplink path in the illustrated embodiments to simplify the illustrations. It should be appreciated that AP 120 of a preferred embodiment comprises a downlink signal path for providing information communication transmission to client wireless devices, such as wireless devices 111-115.

In providing a busy tone for a carrier sense, multiple access, collision avoidance (CSMA/CA) system, such as that of an IEEE 802.11b network, a downlink transmission of IBTG 130 operates on the same frequency channel as the uplink. After a certain amount of time delay, including both the circuit delay and propagation delay from Tx to Rx antenna, the received signal processed by IBTG 130 during transmission of a training sequence becomes a combination of the feedback interference, denoted as "I", and the background noise, denoted as "N". However, with appropriate signal processing, the interference "I" may be extracted, denoted as "Î". In the operating mode, the received signal will be a combination of the wanted signal, denoted as "S", the feedback interference "I", and the background noise "N". Accordingly, in the operating mode, after an amount of delay as is determined in the training mode, the received signal samples are subtracted by Î. The resulting signals then comprise substantially only desired original signal "S" and some component of noise "N", and may be passed to AP signal processing substantially free of interference "I" associated transmission of a busy tone by IBTG 130.

It should be appreciated that the foregoing functional blocks of IBTG 130 may be implemented in software and/or hardware. For example, a processor, having memory and appropriate input/output interfaces associated therewith, may operate under control of an instruction set defining operation according to one or more of the foregoing functional aspects of IBTG 130. Additionally or alternatively, circuitry, such as application specific integrated circuits (ASICs), digital signal processors (DSPs), field programmable gate arrays (FPGAs), programmable read only memories (ROMs), and/or the like may be utilized in providing one or more of the foregoing functional aspects of IBTG 130.

Figure 6:
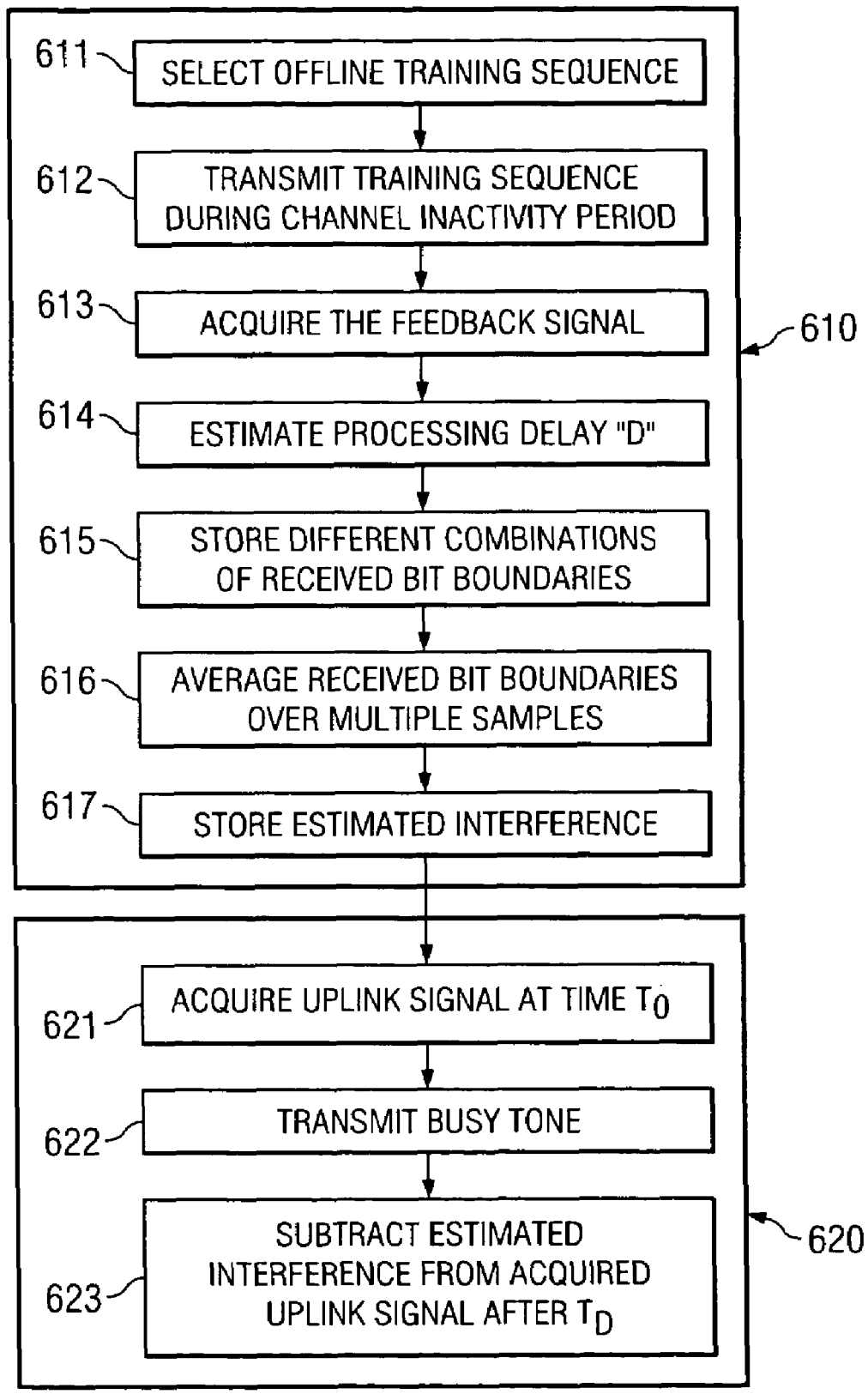
FIG. 6 shows a flow diagram of operation of the intelligent busy tone generator of FIGS. 5A and 5B according to an embodiment.

FIG. 6 shows a flow diagram of operation of IBTG 130 of FIGS. 5A and 5B according to a preferred embodiment. Specifically, the steps of block 610 of FIG. 6 represent operation of IBTG 130 in a training mode and the steps of block 620 represent operation of IBTG 130 in an operating mode.

At step 611 a training sequence is selected by training sequence generator 531 (FIG. 5A). The training sequence is a bit pattern which may be used to emulate a preamble or carrier sequence in wireless network 100. It is helpful to carefully select the training sequence and the carrier-sensing sequence for the feedback interference estimation and cancellation. In selecting the training sequence and the carrier-sensing sequence it may be assumed that the carrier-sense sequence generated by IBTG 130 can be an arbitrary bit pattern, as long as each bit of it is modulated by the same technique as specified in the communication system's standards (e.g., using the same Barker code in an IEEE 802.11b implementation). This is a reasonable assumption as a purpose of the busy tone is to transmit something in the downlink that the client wireless devices can detect as comprising a busy channel (e.g., through the wireless devices using energy detection and/or carrier sense mechanisms). In an offline training situation issues with respect to unpredictably interfering with communication signal transmission are minimized, and therefore the system may exercise substantial freedom in selecting a bit pattern of the training sequence. Accordingly, a scrambled (e.g., random or quasi-random) pattern of bits may be selected for the training sequence which closely mimics an actual communication preamble and which provides a bit pattern which is optimized to provide desired interference information (e.g., particular bit transitions). According to embodiments of the invention, the training sequence is all "1" if the carrier-sensing packet (busy tone) is all "0" or all "1", while the training sequence is a scrambled bit pattern, such as "00010" described below, for other carrier-sensing packets (busy tones).

At step 612 the training sequence is transmitted as an RF signal by antenna 533 of IBTG 130. For example, RF circuit 532 may convert a string of digital bits provided by training sequence generator 531 to an RF signal having a frequency corresponding to a communication channel of wireless network 100 and provide that signal to antenna 533 for transmission. It should be appreciated that RF circuit 532 may provide the training sequence in any format corresponding to a communication channel of wireless network 100, including frequency, time, and/or code division channels.

As can be seen in FIG. 5A, antenna 533 of IBTG 130 is not sufficiently isolated from antenna 121 coupled to AP 120 to prevent feedback of the training sequence and busy tone carrier sequence. Accordingly, the training sequence is received at antenna 121 and passed to circuitry of AP 120, such as RF circuitry 522 providing down-conversion of the received RF signal to an analog baseband signal. This received feedback signal is provided to analog to digital converter 535 of the embodiment of IBTG 130 illustrated in FIG. 5A for conversion to a digital bit stream. However, because the training sequence is not an actual communication signal, embodiments of IBTG 130 do not operate to pass a signal associated with the training signal feedback to baseband processing circuitry of AP 120.

The digital bit stream is provided to acquisition circuitry 536 for acquisition of the training sequence (step 613). Acquisition of the training sequence by acquisition circuitry 536 preferably comprises carrier sensing (e.g., recognizing a carrier indicative of a communication via the appropriate protocols) and detecting the particular bits received.

At step 614, a processing delay "D" is estimated by acquisition circuitry 536. Processing delay D may be determined as the delay between the initiation of training sequence transmission (time $T_O$) and the acquisition of the training sequence (time $T_D$). It is expected that, using the circuitry illustrated, that a processing delay estimation error will be within one clock cycle (one chip duration) because the energy level of the received interference is expected to be very strong and, thus, provide a high probability of estimating the delay accurately. The actual estimation error experienced will depend on the timing resolution available, e.g., the clock cycle time.

An objective of the training mode is to estimate the interference "I" resulting from feedback of the busy tone transmission. Accordingly, IBTG 130 of the illustrated embodiment includes feedback estimation circuitry 537 which stores the feedback signal samples for bit "1" and bit "0", denoted as "$I_0$" and "$I_1$" respectively (step 615). However, due to the timing resolution on the delay estimation, the circuitry of IBTG 130 may not precisely identify the boundary between bits. It is likely that the $I_0$ and $I_1$ stored by feedback estimation circuitry 537 will cross over two bits. Accordingly, feedback estimation circuitry 537 of a preferred embodiment may store 4 different combinations of bit boundaries, namely, 00, 01, 10, and 11. Because the bit boundaries 00 and 11 are counter-phase, and similarly the bit boundaries 01 and 10 are counter-phase, storage of combinations of bit boundaries may be further optimized, such as to store bit boundaries 00 and 01 or bit boundaries 11 and 10. Storage of a simple pattern, such as "001," serves the purpose of storing an optimized set of bit boundaries for use in interference cancellation according to embodiments of the invention.

It should be appreciated that the feedback signal acquired by acquisition circuitry 536 not only includes the interference signal "I" associated with transmission of a busy tone by IBTG 130, but also includes a noise component "N" associated with thermal noise or other noise sources. Accordingly, feedback estimation circuitry 537 of a preferred embodiment operates to provide averaging over multiple bit pattern samples to reduce the background noise level and, hence, increase the estimation accuracy of the "I" part of the received training signal (step 616).

At step 617 an estimated interference signal (denoted in FIG. 5A as "Interf_est") is stored by feedback estimation circuitry 537. The estimated interference signal is preferably derived as a function of the acquired feedback signal bit stream averaged to mitigate noise error, and is used in an operating mode to cancel interference associated with transmission of a busy tone corresponding to the training sequence. According to a preferred embodiment, the foregoing training mode is implemented frequently enough and/or at appropriate times so that the estimated processing delay and channel conditions experienced during a corresponding operating mode will be the same, or substantially the same so as to be statistically the same, as those of the latest training mode operation.

Figure 7:
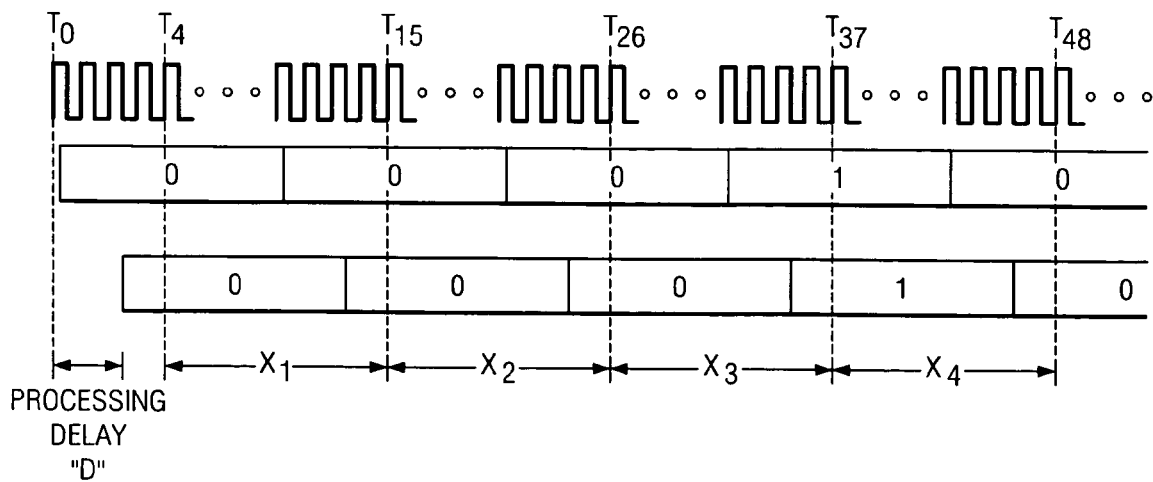
FIG. 7 shows an exemplary timing chart for operation of offline training in accordance with the steps of the flow diagram of FIG. 6.

FIG. 7 shows an exemplary timing chart for operation of offline training in accordance with the above described steps of block 610 of the flow diagram. In the illustration of FIG. 7, each clock cycle represents one chip duration. It should be appreciated that, in the illustrated embodiment, one clock cycle has been equated to one chip duration to simplify the concepts presented. Embodiments of the invention may utilize configurations in which there is not a one to one correspondence between clock cycles and chip duration, such as where oversampling provides a chip duration which includes multiple sampling clock cycles. At clock cycle $T_0$, IBTG 130 begins transmission of a training sequence, e.g., "00010". From operation of acquisition circuitry 536, the processing delay is estimated to be 3 clock cycles. Taking the estimation error into account (e.g., 1 clock cycle), IBTG 130 begins storing received signal samples at time $T_4$ (estimation error plus the processing delay D). In the timing chart of FIG. 7, the received signal samples are represented as X1, X2, X3 and X4, and comprise every 11 clock cycles. As can be seen in the timing diagram, X1 and X2 are co-phase, and X3 and X4 are counter-phase. Accordingly, the estimated 11-chip interference for bit boundaries "00" and "01" can be obtained as follows:

$$\hat{I}_{00}=(X_1+X_2)/2=I_{00}+N' \quad (1)$$

$$\hat{I}_{01}=(X_3-X_4)/2=I_{01}+N'' \quad (2)$$

Wherein the estimated 11-chip interference "I" for bit boundary "00" is represented by equation (1) above and the estimated 11-chip interference "I" for bit boundary "01" is represented by equation (2) above. It should be appreciated that the variance of the residual noise terms N' and N'' is ½ of the original "N" part. Of course, the foregoing process may be extended to averaging over more than 2 co-phase samples and counter-phase samples to further reduce the noise level and improve the quality of the estimated interference, if desired.

Objectives of IBTG 130 in an operating mode according to embodiments of the invention are to recognize receipt of a carrier at AP 120, transmit a busy tone without substantial delay for receipt by various ones of wireless devices 111-115 throughout the received communication, and mitigate interference associated with feedback of the busy tone at AP 120. Accordingly, in an operating mode of a preferred embodiment, IBTG 130 cancel interference by subtracting the received signal samples by appropriately using the above described "$I_0$" or "$I_1$" determined during the training mode.

At step 621 (FIG. 6), acquisition circuitry 536 (FIG. 5B) detects a valid communication signal as received by AP 120. For example, acquisition circuitry 536 may operate to detect an incoming valid 802.11b packet, without actually determining a particular bit pattern. Acquisition circuitry 536 of the illustrated embodiment provides a control signal to carrier-sensing sequence generator 539 upon acquiring an appropriate received signal.

At step 622, and in response to a control signal provided by acquisition circuitry 536, carrier-sensing sequence generator 539 selects an appropriate carrier sequence to comprise a busy tone, and causes the carrier sequence to be transmitted. The carrier sequence is a bit pattern, preferably corresponding to that of the training sequence, which may be used to emulate a preamble or carrier sequence in wireless network 100. For example, RF circuit 532 may convert a string of digital bits provided by carrier-sensing sequence generator 539 to an RF signal having a frequency corresponding to a communication channel of wireless network 100 and provide that signal to antenna 533 for transmission.

After waiting for the estimated processing delay D plus one additional clock cycle (the estimation error in the foregoing example) since the transmission of the carrier-sensing sequence (busy tone) is initiated, subtractor 534 begins interference cancellation by using the interference estimation signal "Interf_est" stored by feedback estimation circuitry 537 (step 623). For example, in the foregoing example subtractor 534 performs subtraction for every 11 chips using $\hat{I}_{00}$, $-\hat{I}_{00}$, $\hat{I}_{01}$, or $-\hat{I}_{01}$ based on the appropriate bit phases present in the received signal. The received signal having interference associated with transmission of a busy tone by IBTG 130 canceled is passed to processing circuitry of AP 120 for communication processing consistent with the conventional operation of an AP in wireless network 100. For example, digital to analog converter 538 may convert the interference cancelled received signal into a baseband analog signal for passing to baseband processing circuitry 521 of AP 120.

Although an embodiment of offline training discussed above with respect to the flow diagram of FIG. 6 has been described with reference to a scrambled bit sequence, offline training implemented according to the present invention may use bit sequences which are not scrambled and/or different bit sequences between training and operation modes. For example, operation of offline training according to the flow diagram of FIG. 6 can be simplified by choosing to use all "1" bits as the carrier-sensing sequence in the operating mode in the sense that the training sequence can be shortened in order to obtain the same quality of interference estimation. In the above example, the 5-bit training pattern can be replaced by "111". The training mode can be further simplified by removing acquisition steps, such as if the maximum possible Tx-Rx feedback delay is given.

Figure 8:
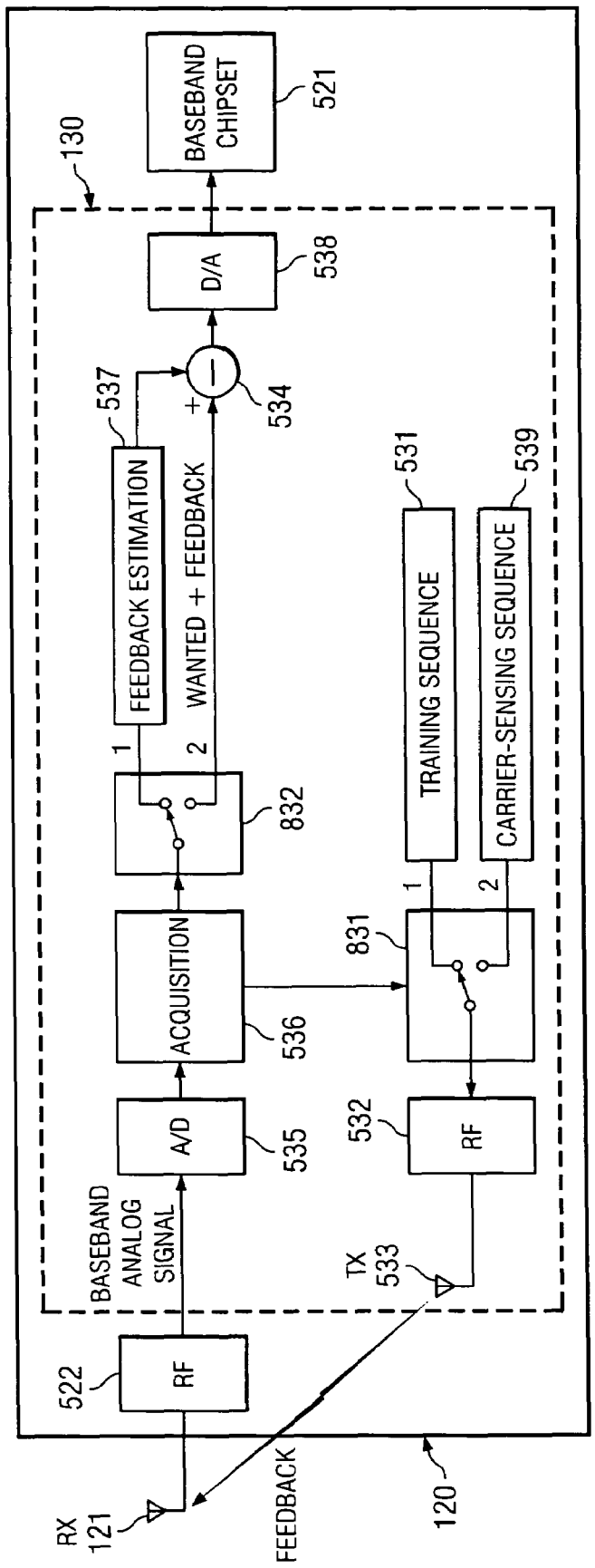
FIG. 8 shows a functional block diagram of an intelligent busy tone generator adapted to provide online training according to an embodiment of the present invention.

Having described an exemplary offline training embodiment above, reference is now made to FIG. 8 wherein a functional block diagram of IBTG 130 adapted to implement online training according to an embodiment is shown. As shown in FIG. 8, IBTG 130 adapted to provide online training according to the illustrated embodiment is provided as a RF front-end device in the receive path of AP 120. In online training, the training is done when the channel is being utilized in providing wireless communications. Accordingly, FIG. 8 shows a functional block diagram of IBTG 130 operating in a training mode during a time in which the communication channel is being used for uplink communications by one of wireless devices 111-115. Likewise, the functional block diagram of FIG. 8 shows IBTG 130 operating in an operating mode during a time in which the communication channel is being used for uplink communication.

As discussed with respect to the offline training mode embodiment of FIGS. 5A and 5B, RF circuitry 522 of the embodiment illustrated in FIG. 8 operates in reception mode, providing gain steps and down conversion from RF frequency to baseband signal. Analog to digital (A/D) converter 535 (preferably including A/D conversion for an in-phase (I) component of the received signal and a quadrature (Q) component of the received signal) takes the baseband analog signal, oversamples it, and digitizes it. Acquisition circuitry 536 of a preferred embodiment comprises a combination of carrier detector, e.g., based on the detection of Barker code modulated symbols, and a bit pattern detector, e.g., based on the given scrambled and differentially encoded preamble bits specified in the communication standards used by wireless network 100, such as IEEE 802.11b protocols. In operation, upon preamble bit pattern acquisition, an online short training sequence is sent out through RF circuitry 532 and transmit antenna 533. RF circuitry 532 of the illustrated embodiment handles filtering, up-conversion, and amplification of signals.

In providing a busy tone for a carrier sense, multiple access, collision avoidance (CSMA/CA) system, such as that of an IEEE 802.11b network, a downlink transmission of IBTG 130 operates on the same frequency channel as the uplink. After a certain amount of time delay, including both the circuit delay and propagation delay from Tx to Rx antenna, the received signal samples become a combination of the original wanted signal "S", the feedback interference "I", and the background noise "N". With appropriate signal processing, the interference "I" is extracted, and denoted as "Î". After the training period, IBTG 130 enters into the operating mode, wherein after the same amount of time delay as in the training part since the carrier-sensing sequence is transmitted, the received signal samples are subtracted by Î. The output signals then substantially contain the signal "S" and some component of the noise "N", and may be passed to AP signal processing circuitry for processing without interference associated with the busy tone.

It should be appreciated that the foregoing functional blocks of IBTG 130 may be implemented in software and/or hardware. For example, a processor, having memory and appropriate input/output interfaces associated therewith, may operate under control of an instruction set defining operation according to one or more of the foregoing functional aspects of IBTG 130. Additionally or alternatively, circuitry, such as ASICs, DSPs, FPGAs, ROMs, and/or the like may be utilized in providing one or more of the foregoing functional aspects of IBTG 130.

Figure 9:
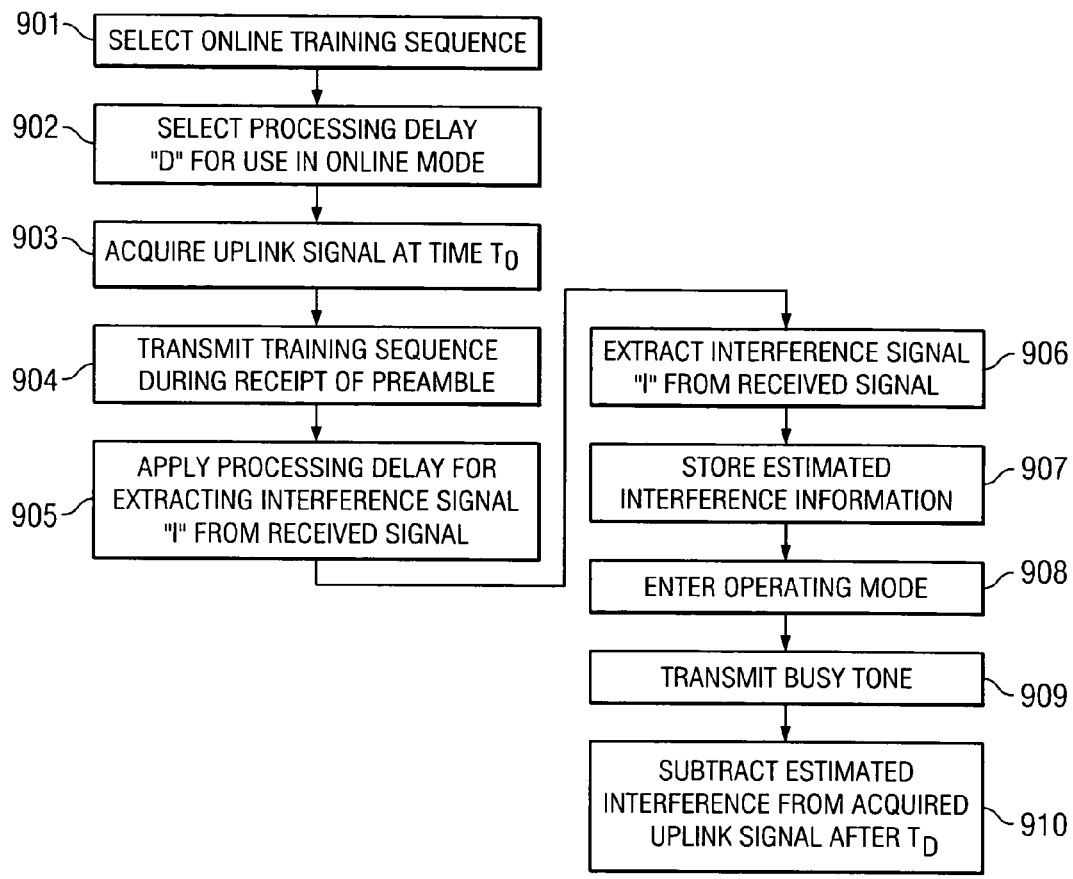
FIG. 9 shows a flow diagram of operation of the intelligent busy tone generator of FIG. 8 according to an embodiment.

FIG. 9 shows a flow diagram of operation of IBTG 130 of FIG. 8 according to a preferred embodiment. It should be appreciated that, as the flow diagram of FIG. 9 sets forth operation according to an online training mode, the steps depicted therein associated with training mode operation as well as the steps depicted therein associated with operating mode operation may be performed during reception of an uplink transmission by AP 120.

At step 901 a training sequence is selected by training sequence generator 531 (FIG. 8). The training sequence is a bit pattern which may be used to emulate a preamble or carrier sequence in wireless network 100. It is helpful to carefully select the training sequence and the carrier-sensing sequence for the feedback interference estimation and cancellation. In selecting a training sequence and a carrier-sensing sequence it may be assumed that the carrier-sense sequence generated by IBTG 130 can be an arbitrary bit pattern, such as all "1" bits, as long as each bit of the sequence is modulated by the same techniques as the communication system specification, e.g., the same Barker code in an IEEE 802.11b implementation. This is a reasonable assumption as a purpose of the busy tone is to transmit something in the downlink so that the client wireless devices can detect the busy channel, such as through energy detection and/or carrier sense mechanisms. In an online training situation issues with respect to unpredictably interfering with communication signal transmission are a concern, and therefore the system may restrict selection of a bit pattern for the training sequence to simple, more predictable, patterns, such as all "1" bits or all "0" bits.

At step 902 a processing delay for use in online training mode and operating mode is selected. For example, it may be assumed that the maximum possible delay from transmission of the busy signal to reception and processing of the feedback signal is known and fixed, e.g., k μs, and the processing delay to be used by IBTG 130 may be set for both the training and operating modes to k μs. Additionally or alternatively, a processing delay may be determined empirically, such as discussed above with respect to the offline training mode of FIGS. 5A and 6.

At step 903 acquisition circuitry 536 detects a valid communication signal as received by AP 120 and acquires the data bits thereof. Acquisition circuitry 536 of the illustrated embodiment provides a control signal to multiplexer switches 831 and 832 to place IBTG 130 in training mode upon acquiring an appropriate received signal. Specifically, multiplexer switch 831 couples training sequence generator 531 in communication with RF circuitry 533 to facilitate transmission of a training sequence. Similarly, multiplexer switch 832 places feedback estimation circuitry 537 in the receive signal path to facilitate analysis of the received signal for interference estimation and storage.

At step 904 the training sequence is transmitted as an RF signal by antenna 533 of IBTG 130. For example, RF circuit 532 may convert a string of digital bits provided by training sequence generator 531 to an RF signal having a frequency corresponding to a communication channel of wireless network 100 and provide that signal to antenna 533 for transmission. It should be appreciated that RF circuit 532 may provide the training sequence in any format corresponding to a communication channel of wireless network 100, including frequency, time, and/or code division channels.

As can be seen in FIG. 8, antenna 533 of IBTG 130 is not sufficiently isolated from antenna 121 coupled to AP 120 to prevent feedback of the training sequence and busy tone carrier sequence. Accordingly, the training sequence is received at antenna 121 and passed to circuitry of AP 120, such as RF circuitry 522 providing down-conversion of the received RF signal to an analog baseband signal. This received feedback signal is provided to analog to digital converter 535 of the embodiment of IBTG 130 illustrated in FIG. 8 for conversion to a digital bit stream.

It should be appreciated that during transmission of the training sequence the desired received signal may be substantially interfered. However, because the training sequence is selected according to embodiments of the present invention to be relatively short (e.g., on the order of 1 to 20 bits), and training mode operation to be completed very quickly, it is expected that transmission of the training sequence will not interfere with packet payload data. Instead, transmission of a training sequence according to embodiments of the present invention interferes with preamble data which is either non-essential (e.g., used only as a carrier-sense mechanism which has already been accomplished by acquisition circuitry 536) or sufficiently redundant (e.g., having error correction techniques employed with respect thereto) so as to allow the foregoing interference without substantially impacting system operation. Accordingly, when feedback estimation circuitry 537 is switched in the receive path by multiplexer switch 832 during training mode, embodiments of IBTG 130 do not operate to pass the received signal to baseband processing circuitry of AP 120.

At step 905 the processing delay "D" is applied with respect to feedback estimation circuitry 537 analyzing the received signal for extracting the interference "I". As discussed above, after the time associated with delay "D" the received signal will include the original wanted signal "S", the feedback interference "I", and the background noise "N".

With appropriate signal processing, the interference "I" may be extracted from the received signal. For example, bit patterns for the wanted signal "S", as acquired in step 903, may be utilized in determining the interference "I". Depending upon an acceptable estimation error level with respect to determining interference "I", different bit patterns for "S" may be utilized according to embodiments of the invention. The bit patterns that may be used to do interference estimation are referred to herein as primitive patterns. The primitive pattern for a fixed requirement is not unique. For instance, to reduce the noise level to ¼ of the original during the estimation, embodiments of the invention may use any of the following primitive patterns: (a) "101 . . . 101" (or equivalently "010 . . . 101"); (b) "10101" (or equivalently "01010"); (c) "1010 . . . 01"; (d) "10 . . . 10 . . . 01 . . . 01" (or "10 . . . 01 . . . 10 . . . 01", or "10 . . . 01 . . . 01 . . . 10"); (e) "111 . . . 000"; (f) "111000"; and (g) "11 . . . 11 . . . 00 . . . 00" (or "11 . . . 00 . . . 11 . . . 00", or "11 . . . 00 . . . 11 . . . 00"). The decision with respect to which primitive pattern to be used in the training process of an embodiment of the present invention is a function of the primitive patterns that are available in the actual preamble sequence as well as system latency tolerance.

At step 906 feedback estimation circuitry 537 extracts interference signal "I" from the received signal and stores the information for use in canceling interference in the operating mode. In contrast to the offline training embodiment described above, the illustrated embodiment for online training does not estimate the Tx-Rx feedback delay because the maximum possible delay is determined a priori (e.g., from manufacturer information, empirical testing, simulation, and/or the like). Moreover, as preferred embodiment online training modes use training and busy tone sequences which are all "1" or "0" bit patterns, issues with respect to bit boundaries are not present in this embodiment.

At step 907 an estimated interference signal is stored by feedback estimation circuitry 537. The estimated interference signal is preferably derived as a function of the acquired feedback signal bit stream, and is used in an operating mode to cancel interference associated with transmission of a busy tone corresponding to the training sequence.

Figure 10:
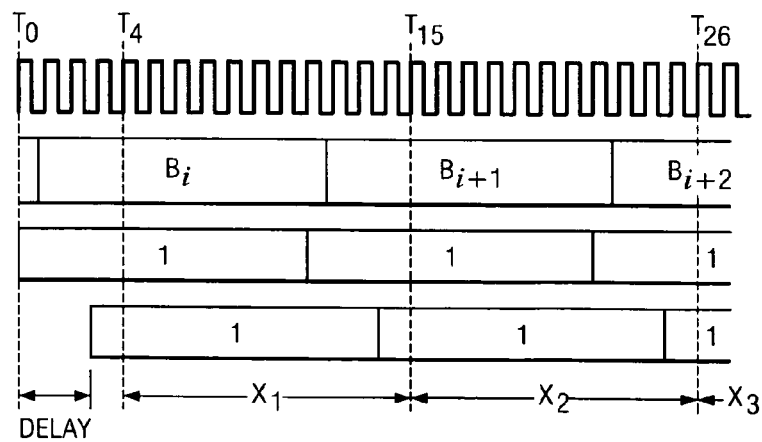
FIG. 10 shows an exemplary timing chart for operation of online training in accordance with the steps of the flow diagram of FIG. 9.

FIG. 10 shows an exemplary timing chart for operation of online training in accordance with the above described steps. In the embodiment of FIG. 10 there is one clock cycle per chip duration. At clock cycle $T_0$, a training sequence, such as an all "1" bit training sequence, is transmitted upon the detection of an incoming wanted packet with bit pattern $\{\ldots, B_i, B_{i+1}, B_{i+2}, \ldots\}$. After the selected delay "D", e.g., a known maximum Tx-Rx delay of 4 clock cycles, the received signal samples as $X_1, X_2, X_3, \ldots$ are stored for every 11 clock cycles (or chip units). Each sample $X_k$ contains all the interference "I", signal "S", and noise "N" components of the received signal. Due to the periodic characteristic of the training sequence, the interference "I" component in each sample $X_k$ will be the same for all k. To estimate interference "I" according to a preferred embodiment, feedback estimation circuitry 537 may utilize two samples X in which the signals "S" are counter-phase, and then sum them up. By doing this, the signal "S" is canceled and the noise level "N" is also reduced by ½. This process can be extended to multiple counter-phase pairs to further reduce the noise level.

To give an example, assume $[B_i B_{i+1} B_{i+2} B_{i+3} B_{i+4}]$ = [10101]. The interference "I" may be estimated as follows:

$$\hat{I} = (X_1 + X_2 + X_3 + X_4)/4 \qquad (3)$$
$$= I + N'$$

It should be appreciated that in the above estimation of interference "I", the variance of the residual noise term "N'" is ¼ of the original "N".

After the training process, the illustrated embodiment proceeds to an operating mode wherein a busy tone is transmitted by IBTG 130 for receipt by various ones of wireless devices 111-115 throughout the received communication, and wherein IBTG 130 operates to mitigate interference associated with feedback of the busy tone at AP 120. Accordingly, at step 908 IBTG 130 enters an operating mode by providing a control signal to multiplexer switches 831 and 832 to place IBTG 130 in operating mode upon completion of a training mode. Specifically, multiplexer switch 831 places carrier-sensing sequence generator 539 in communication with RF circuitry 533 to facilitate transmission of a carrier sequence (busy tone). Similarly, multiplexer switch 832 places subtractor 534 in the receive signal path to facilitate removal of interference "I" from the received signal before passing the received signal to subsequent signal processing circuitry of AP 120.

At step 909, and in response to IBTG 130 having been placed in an operating mode, carrier-sensing sequence generator 539 selects an appropriate carrier sequence to comprise a busy tone, and causes the carrier sequence to be transmitted. The carrier sequence is a bit pattern, preferably corresponding to that of the training sequence, which may be used to emulate a preamble or carrier sequence in wireless network 100. For example, according to a preferred embodiment the transmission of an all "1" carrier-sensing sequence is initiated by carrier-sensing sequence generator 539. RF circuit 532 may convert a string of digital bits provided by carrier-sensing sequence generator 539 to an RF signal having a frequency corresponding to a communication channel of wireless network 100 and provide that signal to antenna 533 for transmission.

After waiting for the selected or estimated processing delay D since the transmission of the carrier-sensing sequence (busy tone) is initiated, subtractor 534 begins interference cancellation by using the interference estimation signal stored by feedback estimation circuitry 537 (step 910). For example, in the foregoing example subtractor 534 subtracts the received signals by I for every 11 clock cycles. The received signal having interference associated with transmission of a busy tone by IBTG 130 canceled is passed to processing circuitry of AP 120 for communication processing consistent with the conventional operation of an AP in wireless network 100. For example, digital to analog converter 538 may convert the interference cancelled received signal into a baseband analog signal for passing to baseband processing circuitry 521 of AP 120.

From the foregoing, it should be appreciated that there may be various advantages and disadvantages associated with the use of offline training or online training in any particular scenario. Some considerations with respect to selection and implementation of offline and online training techniques are set forth below.

In an online training implementation according to embodiments of the invention, a preamble bit phase for each wanted uplink packet is acquired. Accordingly, in an IEEE 802.11b implementation, both long and short preambles should be supported.

Additionally, in an online training implementation according to embodiments of the invention, the maximum possible delay (including all the circuit delays and propagation delay) from Tx to Rx at the AP side should be known for all conditions. In order to facilitate online training according to embodiments, the carrier-sensing packet (busy tone) is an all "1" or all "0" sequence, with no scrambling and no differential encoding. Likewise, according to embodiments the training sequence is all "1" or all "0", with the training sequence length depending on which primitive pattern could be found at the actual preamble.

It should be appreciated, however, that the interference estimated during the online training mode of embodiments of the present invention is very reliable. For example, because the time separation between the operating mode and the training mode is very small, compared with the coherent interval of the feedback path, it is expected that the interference estimates made during online training will be highly correlated to the interference experienced during busy tone transmission.

In contrast to online training, offline training according to embodiments of the present invention operates to detect each wanted uplink packet in an operating mode, without bit phase synchronization, because such detection may be used only to initiate transmission of a busy tone. Accordingly, long and short preambles may be treated in the same way.

In offline training according to embodiments of the invention, information with respect to the maximum Tx-Rx delay (including all the circuit delays and propagation delay) may readily be determined empirically. Additionally, the carrier-sensing packet (busy tone) can be arbitrary, e.g., random or quasi-random, in embodiments of an offline training implementation. However, it should be appreciated that, the longer the length of the training sequence is, the higher the risk is that it could be interrupted when the AP has something to transmit. The estimated interference during the training mode may become unreliable if the time separation between the operating process and the latest training process is larger than the coherent interval of the feedback path.

Recognizing the advantages and disadvantages of implementing online or offline training techniques in a particular scenario, embodiments of the present invention are optimized to benefit from advantages of a particular training technique by implementing a hybrid or combined offline and online training technique. It is an advantage of online training schemes that, since interference estimation is done in real-time, the estimation result tends to be more accurate and there is generally no issue with respect to a collision from the AP's transmission. However, as discussed above, online training presents challenges in that online training according to embodiments does chip synchronization to acquire the specific bit pattern. The foregoing chip synchronization presents issues with respect to the busy tone generator beginning to transmit a busy tone signal only after it successfully detects the specific bit pattern. This increases the latency and results in a larger collision window compared with that of using offline scheme. Accordingly, the collision probability is higher. Moreover, to avoid the latency being too large, busy tone generators of embodiments provide an all "1" or "0" signal. Accordingly, a real preamble is not sent as the busy tone in such embodiments, as compared with that of using an offline scheme of embodiments of the invention. Additionally, when the IBTG fails to identify the specific bit pattern in the uplink signal during an online training operation, a busy tone is not transmitted according to embodiments.

In order to address the foregoing issues with respect to online training implementations, while receiving benefit from advantages thereof, embodiments of the invention combine concepts of online and offline training schemes. In operation according to a combined offline and online training implementation according to one embodiment, the IBTG implements various of the above described aspects of the offline and online schemes. For example, an IBTG implementing a combined offline and online training technique may do data acquisition like that of the offline schemes described above. When the IBTG detects an uplink signal, the IBTG begins to transmit all "1" or "0" signal so that one or more of the wireless devices served by the AP can know that the channel is busy. In this way, the collision window is the same as that in offline scheme. Additionally, the IBTG of a combined offline and online technique embodiment attempts to detect the received bit pattern so that the IBTG can use an online scheme (such as that set forth above with respect to FIG. 9) to estimate the interference. However, since the transmitted busy tone signal generated by the IBTG also generates interference, the IBTG operates to remove the interference in order to find specific bit pattern of the uplink signal. By saving the estimated interference result of interference coming from a previous received frame, the IBTG of an embodiment can remove the interference so that the specific bit pattern can be found. Having acquired the bit pattern of the uplink signal, the IBTG of a preferred embodiment then carries out online interference estimation. Once online interference estimation is finished, the old interference estimation result is updated with new estimated result and the remaining interference cancellation is done with the most updated estimation result.

If the IBTG fails to find a specific bit pattern, the estimation result will not be updated according to embodiments of the invention.

It should be appreciated that, in the foregoing combined online and offline technique, since the detection of specific packet relies on a previous interference estimation result, an offline interference estimation result (such as set forth with respect to FIG. 6 above) may be utilized. For example, an initial estimation of interference can come from an offline estimation when the AP is powered on or from an online estimation when AP receives the first packet.

According to preferred embodiments of combined online and offline techniques, a timer is used to measure the time interval between two received packets. Since the channel may have varied appreciably if the time interval is too long, when the timer indicates that a predetermined amount of time has transpired between received packets, an offline training interference estimation is done according to an embodiment to update the estimated result or only online training is done in the following received frame.

Since the time latency restriction for the online training using combined scheme is somewhat relaxed (e.g., the IBTG began to transmit a busy tone immediately after it acquires data), the IBTG can detect two or more specific bit patterns transmitted by the IBTG. By detecting various transmitted bit patterns, all the possible interference patterns can be found in online training. The IBTG of embodiments may then transmit a real preamble after the finish of online training.

It should be appreciated that the above described embodiments present "intelligent busy tone generator" solutions to overcome the hidden-node problem in wireless LAN. Embodiments of the invention may be implemented as a hardware component embedded in an access point, serving as one-way entry from RF front-end to baseband processor for uplink data flow. In operation, upon uplink preamble acquisition, an IBTG may generate a busy tone, e.g., a carrier-sense sequence, in the downlink through the RF front-end device and the Tx antenna, while passing the received signal after signal processing to the baseband chipset. Because the busy tone is transmitted at the same time and on the same frequency as the uplink packet, antenna isolation and signal processing including interference estimation and interference cancellation are preferably implemented with respect to preferred embodiment IBTG. Additionally, because all nodes, including hidden-nodes, receive a busy tone according to embodiments of the invention, RTS/CTS handshake options may be turned off in a wireless network to provide increased throughput capacity etcetera.

It should be appreciated that, although particular exemplary embodiments have been described herein, the concepts of the present invention are not limited to the specific embodiments described. For example, although embodiments have been described herein with reference to a wireless network implementing IEEE 802.11b protocols, the concepts of the present invention are applicable to any number of communication protocols. According to one embodiment, the functional block diagram of IBTG 130 used in an IEEE 802.11a implementation is the same as that used in 802.11b (e.g., FIGS. 5A, 5B, and 8). However, the data acquisition algorithm and the carrier-sense sequence may be different.

As specified in the EEE. 802.11 standards, the preamble field in the 802.11a packet comprises 10 repetitions of a short orthogonal frequency division multiplex (OFDM) training symbol and 2 repetitions of a long OFDM training symbol, preceded by a guard interval. The short symbols are used for AGC convergence, diversity selection, timing acquisition, and coarse frequency acquisition, while the long symbols are used for channel estimation and fine frequency acquisition. A preferred embodiment IBTG adapted for use with respect to an IEEE 802.11a implementation captures the received packet by looking at the short sub-preamble. In the time domain, there are two commonly used methods, calculating the auto-correlation of the received sequence with its delayed version and calculating the correlation between the received sequence and a local copy of the short OFDM symbol. These can be expressed as follows:

$$P(n) = \sum_{l=0}^{L-1} r_{n+l} r^*_{n+l-L} \qquad (4)$$

$$Q(n) = \sum_{l=0}^{L-1} r_{n+l} g^*_l \qquad (5)$$

Where $r_n$ is the n-th received sample, L is the total number of samples over one short symbol, and $g_0, g_1, \ldots, g_{L-1}$ are the samples of the short OFDM symbol. By comparing the correlation value with a threshold, it can be determine whether there is a valid received 802.11a packet.

Recalling that each bit of a carrier-sense sequence in the 802.11b case is spread by the 11-chip Barker code, a similar approach may be used in the 802.11a case. That is, each symbol of the carrier-sense sequence may be modulated by the short OFDM symbol in order to facilitate the client wireless devices detecting the busy mode of the channel.

The previously set forth online training, offline training, and combined training techniques apply directly in the 802.11a case. In particular, for the offline training scheme, both the training sequence and the carrier-sense sequence can be a repetition of the short OFDM symbols, i.e. all "short OFDM symbol". For the online training scheme, as the wanted packet is repetitive in the short sub-preamble, the training sequence can be designed as the alternative of the short OFDM symbol with its 180-phase offset version, i.e. $[\vec{g} - \vec{g} \ \vec{g} \ldots]$, where $\vec{g}$ denotes the signal vector of the short OFDM symbol. By subtracting two consecutive received symbols during the online training period, the interference component combined with some irreducible background noise whose variance is reduced to ½ of the original can be extracted. The actual carrier-sense sequence generated at the operating mode may then designed as alternative of the short OFDM symbol with its 180-phase offset version too, i.e. $[\vec{g} - \vec{g} \ \vec{g} - \vec{g} \ \vec{g} - \vec{g} \ldots]$.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for providing communication collision avoidance in a wireless network, said method comprising:
   detecting receipt of a wireless communication transmission at a node providing communication with a plurality of wireless devices;
   transmitting a signal to be recognized by one or more of said plurality of wireless devices as a busy tone, wherein the transmitted signal to be recognized as a busy tone is transmitted on a same channel portion as said wireless communication transmission until said wireless communication is complete; and
   performing interference canceling to mitigate interference associated with feedback at said node of the transmitted signal to be recognized as a busy tone.

2. The method of claim 1, wherein said detecting receipt of a wireless communication transmission comprises:
   detecting a received signal energy level consistent with that of a desired wireless communication transmission.

3. The method of claim 1, wherein said detecting receipt of a wireless communication transmission comprises:
   acquiring modulation information consistent with that of a desired wireless communication transmission.

4. The method of claim 1, wherein said detecting receipt of a wireless communication transmission comprises:
   acquiring bit information from said wireless communication transmission.

5. The method of claim 1, wherein said node providing communication with a plurality of wireless devices comprises a wireless access point.

6. The method of claim 5, wherein transmitting said signal to be recognized as a busy tone is provided by a busy tone generator coupled to said access point.

7. The method of claim 6, wherein said busy tone generator comprises circuitry embedded in a receive path of said access point.

8. The method of claim 6, wherein said busy tone generator comprises applique circuitry coupled to a receive path of said access point.

9. The method of claim 5, wherein said access point comprises an access point operable according to IEEE 802.11 communication protocols.

10. The method of claim 1, wherein said interference canceling comprises:
    estimating a received interference signal; and
    subtracting said estimated received interference from the received wireless communication transmission when said signal to be recognized is being transmitted.

11. The method of claim 10, wherein said estimating a received interference signal comprises:
    estimating a processing delay associated with said feedback of the transmitted signal to be recognized as a busy tone.

12. The method of claim 1, further comprising:
    terminating transmitting said signal to be recognized as a busy tone when said detected wireless communication terminates.

13. A method for providing communication collision avoidance in a wireless network, said method comprising:
    detecting receipt of a wireless communication transmission at a node providing communication with a plurality of wireless devices;
    transmitting a signal to be recognized by one or more of said plurality of wireless devices as a busy tone, wherein the transmitted signal to be recognized as a busy tone is transmitted on a same channel portion as said wireless communication transmission; and
    performing interference canceling to mitigate interference associated with feedback at said node of the transmitted signal to be recognized as a busy tone, wherein said interference canceling comprises:
      estimating a received interference signal, wherein said estimating a received interference signal comprises performing a training mode offline with respect to receipt of said wireless communication transmission; and
      subtracting said estimated received interference from the received wireless communication transmission when said signal to be recognized is being transmitted.

14. The method of claim 13, wherein said training mode comprises:
    transmitting a training sequence of different bits.

15. A method for providing communication collision avoidance in a wireless network, said method comprising:
    detecting receipt of a wireless communication transmission at a node providing communication with a plurality of wireless devices;
    transmitting a signal to be recognized by one or more of said plurality of wireless devices as a busy tone, wherein the transmitted signal to be recognized as a busy tone is transmitted on a same channel portion as said wireless communication transmission; and
    performing interference canceling to mitigate interference associated with feedback at said node of the transmitted signal to be recognized as a busy tone, wherein said interference canceling comprises:
      estimating a received interference signal, wherein said estimating a received interference signal comprises performing a training mode online with respect to receipt of said wireless communication transmission; and
      subtracting said estimated received interference from the received wireless communication transmission when said signal to be recognized is being transmitted.

16. The method of claim 15, wherein said training mode comprises:
    transmitting a training sequence of the same bit.

17. A method for providing communication collision avoidance in a wireless network, said method comprising:
    detecting receipt of a wireless communication transmission at a node providing communication with a plurality of wireless devices;
    transmitting a signal to be recognized by one or more of said plurality of wireless devices as a busy tone, wherein the transmitted signal to be recognized as a busy tone is transmitted on a same channel portion as said wireless communication transmission until said wireless communication is complete, wherein said signal to be recognized as a busy tone comprises a bit sequence mimicking a carrier sense sequence.

18. A system for providing communication collision avoidance in a wireless network, said system comprising:
    radio frequency front end circuitry coupled to a receive path of a node in communication with a plurality of wireless devices, wherein said radio frequency front end circuitry includes signal acquisition circuitry, interference cancellation circuitry, training sequence generation circuitry, and interference estimation circuitry operable online to estimate feedback interference associated with transmission of a busy tone sequence, busy tone sequence generation circuitry, and radio frequency transmission circuitry, said busy tone sequence generation circuitry operable in response to signal acquisition by said signal acquisition circuitry to generate a busy tone sequence which is transmitted by said radio frequency transmission circuitry and detected as a carrier sequence in said wireless network.

19. The system of claim 18, wherein said radio frequency front end circuitry is embedded in a receive path of said node.

20. The system of claim 18, wherein said radio frequency front end circuitry is provided as an applique to a receive path of said node.

21. The system of claim 18, wherein said node comprises a wireless network access point.

22. The system of claim 18, wherein said radio frequency transmission circuitry transmits said busy tone sequence on a same channel as a received signal acquired by said signal acquisition circuitry.

23. The system of claim 18, wherein said radio frequency front end circuitry further includes processing delay determination circuitry.

24. The system of claim 18, wherein said busy tone sequence generation circuitry provides a bit sequence detected as a carrier sequence in said wireless network.

25. The system of claim 24, wherein said bit sequence comprises a sequence of a same bit.

26. The system of claim 24, wherein said bit sequence comprises a sequence of different bits.

27. The system of claim 18, wherein said signal acquisition circuitry comprises:
a carrier detector.

28. The system of claim 18, wherein said signal acquisition circuitry comprises;
a bit pattern detector.

29. The system of claim 18, wherein said busy tone sequence generation circuitry comprises:
a memory storing a bit sequence; and
a modulator coupled to said memory providing modulation of said bit sequence.

30. The system of claim 18, wherein said radio frequency transmission circuitry comprises:
an upconverter; and
an antenna.

31. A system for providing communication collision avoidance in a wireless network, said system comprising:
radio frequency front end circuitry coupled to a receive path of a node in communication with a plurality of wireless devices, wherein said radio frequency front end circuitry includes signal acquisition circuitry, interference cancellation circuitry, training sequence generation circuitry, and interference estimation circuitry operable offline to estimate feedback interference associated with transmission of a busy tone sequence, busy tone sequence generation circuitry, and radio frequency transmission circuitry, said busy tone sequence generation circuitry operable in response to signal acquisition by said signal acquisition circuitry to generate a busy tone sequence which is transmitted by said radio frequency transmission circuitry and detected as a carrier sequence in said wireless network.

32. A method comprising:
receiving a data packet communicated via a wireless link, said data packet including a preamble portion and a payload portion; and
transmitting a signal having a format consistent with that of said preamble portion, wherein said transmitting said signal is commenced during receipt of said preamble portion by said receiving step and said transmitting said signal continues throughout receipt of said payload portion by said receiving step;
canceling interference experienced in said receive step associated with feedback of said signal transmitted in said transmitting step, wherein said canceling interference comprises subtracting an interference estimate from said received data packet, and wherein said interference estimate is determined using an offline training technique.

33. The method of claim 32, wherein said signal transmitted in said transmitting step is transmitted on a same channel as said data packet when communicated via said wireless link.

34. A method comprising:
receiving a data packet communicated via a wireless link, said data packet including a preamble portion and a payload portion; and
transmitting a signal having a format consistent with that of said preamble portion, wherein said transmitting said signal is commenced during receipt of said preamble portion by said receiving step and said transmitting said signal continues throughout receipt of said payload portion by said receiving step;
canceling interference experienced in said receive step associated with feedback of said signal transmitted in said transmitting step, wherein said canceling interference comprises subtracting an interference estimate from said received data packet, and wherein said interference estimate is determined using an online training technique.

35. A method comprising:
receiving a data packet communicated via a wireless link, said data packet including a preamble portion and a payload portion; and
transmitting a signal having a format consistent with that of said preamble portion, wherein said transmitting said signal is commenced during receipt of said preamble portion by said receiving step and said transmitting said signal continues throughout receipt of said payload portion by said receiving step;
canceling interference experienced in said receive step associated with feedback of said signal transmitted in said transmitting step, wherein said canceling interference comprises subtracting an interference estimate from said received data packet and applying a processing delay with respect to said subtracting said interference estimate, wherein said processing delay is determined empirically during a training mode.

* * * * *